United States Patent [19]

Rundle

[11] Patent Number: 4,873,095
[45] Date of Patent: Oct. 10, 1989

[54] EXTRACTION OF SOLUBLE MATERIALS FROM WHOLE CITRUS FRUIT

[76] Inventor: Kevin W. Rundle, Box 206, Berri, South Australia, Australia

[21] Appl. No.: 116,319

[22] Filed: Nov. 4, 1987

Related U.S. Application Data

[63] Continuation-in-part of Ser. No. 784,298, Oct. 7, 1985, abandoned.

[30] Foreign Application Priority Data

Oct. 5, 1984 [AU] Australia ............... PG7515

[51] Int. Cl.$^4$ ............... A23L 2/06
[52] U.S. Cl. ............... 426/50; 426/51; 426/52; 426/599; 426/489; 426/495
[58] Field of Search ............... 426/49, 50, 51, 52, 426/599, 615, 655, 431, 425, 409, 495, 429; 99/510

[56] References Cited

U.S. PATENT DOCUMENTS

| | | | |
|---|---|---|---|
| 1,932,833 | 10/1933 | Willaman et al. | 426/50 |
| 3,169,873 | 2/1965 | Clark et al. | 426/431 |
| 3,335,012 | 8/1967 | Bassett | 426/50 |
| 3,711,294 | 1/1984 | Atkins et al. | 426/50 |
| 4,101,678 | 7/1978 | Baker et al. | 426/50 |
| 4,363,264 | 12/1982 | Lang et al. | 99/510 |

Primary Examiner—Marianne Cintins
Attorney, Agent, or Firm—Nixon & Vanderhye

[57] ABSTRACT

A process for the extraction of soluble materials from whole citrus fruit including the skin, said process comprising the steps of:

severing the whole fruit to form fruit slices including the skin;

extracting said fruit slices with water in a counter current extractor to form an extracted juice containing insoluble particulate material, said extraction being conducted such that bitter principles are preferentially retained and/or absorbed by the insoluble material and the introduction of bitter principles into said extracted juice is thus reduced;

subjecting said extracted juice obtained from said counter current extractor to the activity of a pectinase enzyme in an amount and for a time sufficient to reduce the viscosity of said extracted juice to enable removal of at least some of said insoluble particulate material from said extracted juice; and removing at least some of said insoluble particulate material present in said extracted juice together with bitter principles, to give citrus juice of reduced bitterness.

8 Claims, 1 Drawing Sheet

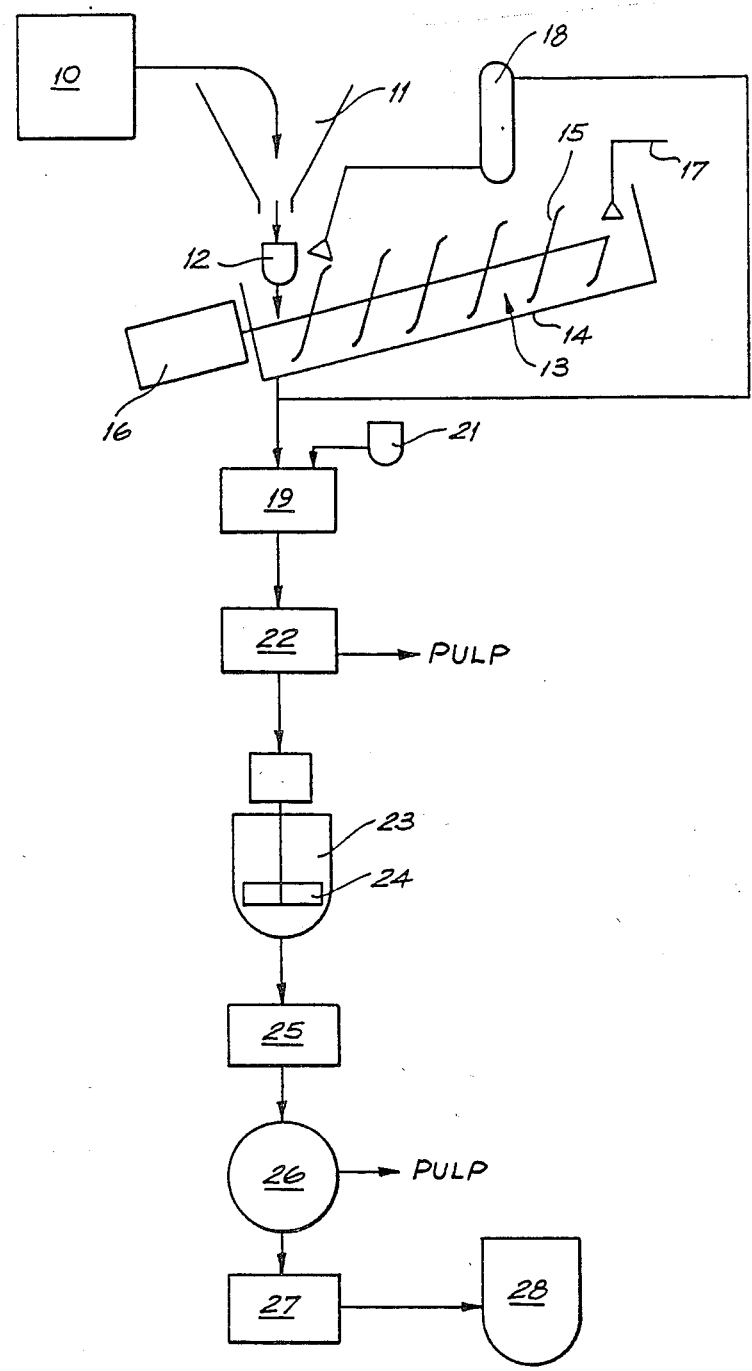

EXTRACTION OF SOLUBLE MATERIALS FROM WHOLE CITRUS FRUIT

CROSS-REFERENCE TO RELATED APPLICATION

This application is a continuation-in-part of application Ser. No. 784,298 filed Oct. 7, 1985, and now abandoned.

BACKGROUND OF THE INVENTION

The present invention relates to a process for the extraction of soluble materials from whole citrus fruit and more particularly to the production of such extracts suitable for human consumption.

SUMMARY OF THE INVENTION

Conventionally citrus juices are sold as fresh whole juice, as reconstituted fruit drinks and as dilutable concentrates. The concentrates may be used for dilution to form the fruit drinks or may be used to form cordials or carbonated beverages. Traditionally all of these products are obtained by mechanical extraction, such as by reaming the endocarp of the fruit. The skin, or exocarp, is not used in the production of traditional fruit juices. It is known that there is a serious problem in citrus fruit juices of the production of bitter flavours which render the juice unpalatable. It has been traditionally thought that the extraction of materials from the skin of the fruit would seriously increase the problem of the "bittering" of the juice. Conventional citrus processing equipment is deliberately designed to avoid the introduction of skin derived materials into the juice stream.

The present inventors have found, surprisingly, that palatable citrus juice products can be produced from whole citrus fruit by counter current extraction and subsequent treatment of the extract with a pectinase enzyme. It is particularly surprising that notwithstanding the fact that whole fruit is extracted and notwithstanding the fact that the extraction is normally carried out at a relatively high temperature, and with agitation which may cause oxidation, there is a reduction in bitterness or other unacceptable flavour detectable in the fruit juice product.

The present invention consists in a process for the extraction of soluble materials from whole citrus fruit including the skin, said process comprising the steps of:

severing the whole fruit to form fruit slices including the skin;

extracting said fruit slices with water in a counter current extractor to form an extracted juice containing insoluble particulate material, said extraction being conducted such that bitter principles are preferentially retained and/or absorbed by the insoluble material and the introduction of bitter principles into said extracted juice is thus reduced;

subjecting said extracted juice obtained from said counter current extractor to the activity of a pectinase enzyme in an amount and for a time sufficient to reduce the viscosity of said extracted juice to enable removal of at least some of said insoluble particulate material from said extracted juice; and removing at least some of said insoluble particulate material present in said extracted juice together with bitter principles, to give citrus juice of reduced bitterness.

The present invention further consists in citrus fruit extract produced by the method according to this invention.

It is believed that the action of the pectinase enzyme allows the removal of a greater percentage of insoluble solids from the juice and it has been surprisingly found that the bitter principles appear to be concentrated in this insoluble solids fraction.

It has further been found that levels of bitter principles in the solids discharge from the counter current extractor are still high in bitter principles but contain negligible amounts of sugars and organic acids. This is surprisingly in that bitter principles are being preferentially adsorbed by the insoluble components of peel (mainly cellulose) relative to the sugars, organic acids and the like which are not adsorbed. That is either they are not being eluted by the water or they are being adsorbed from the liquid or mobile stream (water) passing over the counter flowing (or stationary) solid stream (peel). In fact that there is some natural chromatographic effect at work. In this explanation is further evidenced by the fact that settling of the particulate suspended material which is carried off the extractor in the juice results in a 50% reduction in bitter principles whilst only approximately 2% reduction in volume. Similarly the citrus fruit skin or peel introduced into the counter current extractor has a bitter taste but also has a sweetness and fruit flavour. However, the citrus fruit skin or peel after extraction retains a bitter taste only. This explanation of the action of the present process is given by way of explanation only and the applicants are not bound to this, or any other, explanation.

The citrus fruit used in the process according to this invention preferably is selected from the group comprising oranges, lemons, mandarins and grapefruit, however, other citrus fruit could also be used. It should be noted that while limes have been extracted by counter current diffusion in the past (see U.S. Pat. No. 4,363,264) these fruit do not have the bitterness problem suffered by many other citrus fruit and for this reason it has been traditional to extract lime juice from the whole fruit. The liquid extract obtained from the citrus fruit is hereinafter called juice.

The citrus fruit are preferably subjected to a de-oiling process prior to being treated by a process according to this invention. This de-oiling is a conventional step involving puncturing the oil containing cells in the flavida of the fruit and washing the punctured fruit with water. This process removes a high percentage of the oil content of the skin which would give an unacceptable flavour to the juice extracted from the fruit.

The citrus juice are preferably sliced into thin flat slices prior to extraction. Slices having a thickness of from 3 to 10 mm are preferred, for oranges the most preferred thickness is from 7 to 8 mm and for lemons from 5 to 6 mm. The fruit are preferably straight cut to preserve the integrity of the endocarp. The slicing may be carried out in any suitable slicer. Such slicers are commercially available.

The sliced fruit are extracted by water in a counter current extractor. It is desirable that the fruit are heater prior to or just after introduction to the extractor. It has been found to be particularly preferred if the fruit, and the extracting liquid, are maintained at a temperature of from 55° to 63° C., throughout the extraction. The heating of the fruit slices is desirably brought about, at least in part, by withdrawing some of the extracting liquid from the counter current extractor, heating the withdrawn liquid, and spraying it onto the fruit slices as they enter the extractor and/or just after they have entered the extractor.

The counter current extractor preferably includes a trough-like housing which is upwardly inclined from a fruit inlet end to a fruit outlet end. A helical screw is preferably disposed in the housing and so driven that its direction of rotation is periodically reversed while maintaining a nett forward motion of the fruit from the inlet end to the outlet end of the housing.

Most desirably the counter current extractor is made as described in U.S. Pat. No. 4,363,264 the contents of which are incorporated herein by reference.

The extracted juice obtained from the counter current extractor is dosed with a pectinase enzyme in order to reduce the pectin content of the juice. The enzyme is maintained in contact with the juice for a time sufficient to reduce the viscosity of the juice to a desired extent. The time will be dependent upon the quantity of enzyme added, the nature of the enzyme, and its activity. The desired viscosity will depend upon the use which is to be made of the juice. If the juice is to be used to produce a cloudy product then there must be sufficient pectin retained in the product to stabilise the cloud. If, however, the juice is to be used to produce an essentially clear product then little or no pectin may be required and in this case the enzyme treatment will be prolonged.

Pectin is a strongly water adsorbent protein which occurs in a wide variety of fruit. It is of a high molecular weight and occurs in a dissolved form in the juice of the fruit and in a swollen, but not dissolved form, called protopectin, which serves as a binding substance between the cells of the fruit. Pectin is the main cause of the high viscosity of fruit juices and mashes. Pectolytic enzymes, i.e. pectinases, split pectin into low molecular weight fractions which results in a viscosity reduction and a loss of gelling power. Various types of pectinase are known which variously split soluble pectin or protopectin. Different pectinases typically produce different molecular weight fractions. The particular pectinase used in the present invention will in part depend upon the final use to which the juice is to be used. If a cloudy juice is to be produced it is desirable to use a pectinase which attacks the protopectin preferentially and which leaves fairly high molecular weight fractions, such pectinases include the pectin glycosidases which are particularly preferred for use in the present invention.

The enzyme is deactivated, preferably by pasturisation, after the desired viscosity has been reached. In a typical case the viscosity of the juice is reduced by from 5 to 18 centipoise, preferably 7 to 9 centipoise, by the enzyme treatment.

The juice is preferably finished to remove pulp, i.e. insoluble material either before, during or immediately after the enzymic process. The finishing is carried out by passing the juice through a filter having a pore size of from 50 to 150 thou., preferably 80 to 100 thou. This finishing reduces the pulp concentration of the juice to a value typically between 5 and 10% v/v. The juice is preferably subjected to a further clarification step which is preferably carried out in a centrifuge to further reduce the percentage of pulp in the juice. This further clarification step preferably reduces the pump to below 1% v/v.

The juice so produced may be used as is or it may be concentrated for shipment and use. Typically the juice is concentrated by evaporation to a concentration of from 4:1 to 8:1 depending upon the nature of the juice and its proposed end use.

The juice produced by the process according to this invention has been found to have a good flavour with reduced bitterness and to be particularly useful as a blending material used in amounts up to 10% by volume in fruit juice drinks, up to 5% by volume in carbonated beverages and up to 25% by volume in cordials.

BRIEF DESCRIPTION OF THE DRAWINGS

Hereinafter described by way of example only is a preferred embodiment of the present invention described with reference to the accompanying block diagram.

DETAILED DESCRIPTION OF THE INVENTION

Fresh oranges, lemons or grapefruit are fed through a "Brown" oil extractor 10 to remove the oil present in the flavida of the fruit. In this extractor the skin of the fruit is punctured and the fruit washed. The fruit are then conveyed to a fruit storage bin 11 where they are held pending processing.

The fruit are fed from bin 10 through a slicer 12 which slices the fruit into flat slices of a thickness from 5 to 8 mm. The fruit are steam heated as they pass through the slicer and then drop into a counter current extractor 13 according to U.S. Pat. No. 4,363,264.

The counter current extractor 13 includes a trough-like housing 14 which is inclined upwardly from the fruit inlet end to a fruit outlet end. A helical flight conveyor 15 is disposed within the trough and is adapted to move the fruit slices from the inlet end to the outlet end. The helical flight convenor is rotated by a motor 16 and the direction of rotation is intermittently nreversed. The reversal of direction of the conveyor, while maintaining a nett forward motion, has been found to considerably assist diffusion of the soluble materials from the fruit. A stream of extracting water is introduced through line 17 into the upper or outlet end of the housing 14. The water flows down the housing 14 in counter current with the fruit slices being moved by the conveyor 15.

Some of the extracting liquid is withdrawn from the housing 14, is heated in a heater 18, and is sprayed back into the housing 14 such that it is directed onto the fruit slices as they fall into the housing. The heating of the fruit during slicing, the heating of a part of the extracting stream in heater 18 and a heating jacket (not shown) surrounding the housing 14 serve to heat the extracting stream (hereinafter called juice) to a temperature of from 55° to 58° C. at its point of discharge from the extractor 13.

The juice leaving the extractor 13 flows into a stirred tank 19. An enzyme solution is introduced into the stirred tank 19 from an enzyme solution tank 21. The enzyme solution comprises a 10% w/v solution of the pectin glycosidase sold under the trade mark "ROHAMENT P". This solution of enzyme is introduced into the stirred tank 19 at a rate equivalent to 60 grams of enzyme poweder having an activity of approximately 2,500 pectin glycosidase units per mg. for each tonne of fruit extracted. The juice entering the stirred tank 19 has a viscosity of about 25 centipoise at 55° C. The enzyme concentration and amount is selected to produce a viscosity drop of from 7 to 9 centipoise in a time of from 15 to 20 minutes.

The juice from stirred tank 19 is passed through a finisher 22 where it is separated from pulp having a size of greater than 90 thou. From the finisher 22 the juice passes to a holding tank 23. The juice is introduced continuously into he top of the tank 23 and is withdrawn continuously from the bottom of the tank 23. Stirrers 24 in the tank 23 are intermittently activated to stir up any settled matter in the tank 23. The tank 23 is so sized as to give an average residence time sufficient to produce the desired fall in the juice viscosity.

The juice passes from the holding tank 23 to a pasturiser 25 in which the enzyme is deactivated by heating to a temperature of 85° C. for a period of 15 to 18 seconds. The juice is then cooled to as low a temperature as possible, desirably less than 25° C.

The pasturised juice passes to a centrifuge 26 in which the pulp content is reduced to less than 1% v/v. The juice is then pumped to an evaporator 27 in which the juice is concentrated. The concentration produces a lemon concentrate of about 42/7° Brix or an orange concentrate of about 52.2° Brix by concentration respectively of 5:1 and 6.25:1. The concentrate is held in a product tank 28 pending packaging and despatch.

EXAMPLE 1

PREPARATION OF WHOLE ORANGES AND FRACTIONS OF THE ORANGE FRUIT FOR ANALYSIS

Preparation of samples of oranges from Golden Choice for analysis for AGAL for certain RSK parameters at CSIRO Division of Food Research on Thursday, Nov. 14, 1985.

The oranges were received from Golden Choice and were a mechanically selected random sample from the delivery elevator to the bulk storage bins from the same batch of fruit as used for the preparation of the juice reamed in the Brown extractors and the juice produced using the Counter-Current Extractor 13 described above.

Sample Preparation

The case of fruit was divided randomly into 3 lots discarding fruit that was not sound.
1. 21 oranges Average fruit wt=143 g.
2. 22 oranges Average fruit wt=145 g.
3. 22 oranges Average fruit wt=145 g.

Lots 1 and 2 were combined and hand peeled taking care to separate all the albedo from the "endocarp". Percentage composition of oranges
    Peel=29.1
    "Endocarp"=70.9

The "endocarp"was the passed through a Brown Model 3600 screw press fitted with a 0.020 inch screen to separate the juice from the rag and seeds. The seeds were then separated manually from rag. Percentage composition of "endocarp"
    Juice:=72.5%
    Rag:=26.8%
    Seeds:=0.7%

The whole oranges (lot 3), the peel fraction and the rag fraction from the Brown press were then run separately through a Fitzpatrick Model M comminuting mill fitted with a 0.125 inch screen and with the hammers impact forward and rotated at 3000 rpm.

The juice samples were filled into 74×112.5 mm plain cans and spin cooked 1 min. at 150 rpm in atmospheric steam and then spin cooled under water sprays. The remaining samples were filled as prepared into plain baby food cans (52 ×72.5 mm) and processed stationary for 15 minutes in boiling water and then water cooled.

The following samples were then dispatched to AGAL immediately for analysis.
    Baby food cans labelled "Whole Orange"
    Baby food cans labelled "Peel"
    Baby food cans labelled "Rag"
    74×112.5 mm cans labelled "Orange Juice".

The results of independent analysis conducted on the various samples are set out in Table 1 below.

|  |  | RSK STANDARD | CCE | BROWN | ENDOCARP | ANALYSIS 3 NOVEMBER, 1985 WHOLE ORANGE | PEEL | RAG EX ENDOCARP |
| --- | --- | --- | --- | --- | --- | --- | --- | --- |
| FORMAL NUMBER |  | (AV-17) |  |  |  |  |  |  |
|  | meg/l | 14.25 | 19.4 | 23.0 | 20.2 | 23.2 | 17.2 | 23.5 |
| TOTAL POLYPHENOLICS |  | 0.7 min | 1.820 | 0.76 | 0.707 | 2.72 | 5.70 | 0.890 |
| CITRIC ACID | g/l | 7.6–14.0 | 5.15 | 7.6 | 6.85 | 4.30 | 1.70 | 2.55 |
| L.-MALEIC ACID | g/l | 0.6–3.5 | 1.60 | 2.15 | 1.85 | 1.05 | 0.214 | 0.13 |
| ASH | g/l | 2.9–4.8 | 4.10 | 4.10 | 4.00 | 0.356% w/w | 0.665 | 0.55 |
| POTASSIUM |  | (Av-1.5) |  |  |  |  |  |  |
|  | g/l | 1.0–2.2 | 1.35 | 1.65 | 1.60 | 1.28 | 1.28 | 1.15 |
| SODIUM | mg/l | 12–70 | 50 | 35 | 18 | 43 | 69 | 20.5 |
| MAGNESIUM | mg/l | 75–140 | 55 | 100 | 100 | 150 | 215 | 102 |
| CALCIUM | mg/l | 60–160 | 120 | 105 | 180 | 835 | 1802 | 690 |
| k/mg RATIO |  | 12:1–21:1 | 25.5 | 16.5 | 16.0 | 8.5 | 6.0 | 11.0 |
| GLUCOSE | g/l | 13–29 | 19.5 | 14.7 | 15.5 | 19.7 | 24.4 | 12.8 |
| FRUCTOSE | g/l | 15–33 | 18.7 | 19.1 | 16.9 | 24.4 | 18.5 | 15.3 |
| SUCROSE | g/l |  | 33.5 | 38.6 | 42.2 | 35.2 | 11.6 | 30.0 |
| GLUCOSE/FRUCTOSE RATIO |  | 0.85:1–1:1 | 1.03 | 0.770 | 0.921 | 0.805 | 1.32 | 0.83 |
| ALKALINITY INDEX | eg/kg | 12–16 | 12.4 | 10.9 | 12.0 | 12.5 | 16.9 | 14.1 |
| TITRATABLE ACIDITY (as citric) | g/l | 6.8–12.6 | 6.2 | 7.8 | 6.95 | 4.29 | 2.15 | 4.35 |
| POTASSIUM/ASH RATIO |  | 0.37:1–0.47:1 | 0.329 | 0.402 | 0.400 | 0.360 | 0.196 | 0.209 |
| PHOSPHATE/ASH RATIO |  | up to 0.13:1 | 0.146 | 0.163 | 0.122 | 0.230 | 0.085 | 0.148 |
| PHOSPHATE (as PO$_4$) |  | (Av-450) |  |  |  |  |  |  |
|  | mg/l | 350–650 | 600 | 670 | 490 | 815 | 557 | 818 |
| ASPARAGINE | mg/l | 255–878 | 200 | 185 | 150 | 90 | 13 | 64 |
| GLUTAMINE | mg/l | 25–130 | 55 | 90 | 66 | 58 | 8 | 15 |
| SERINE | mg/l | 105–315 | 155 | 125 | 97 | 60 | 52 | 66 |
| HISTIDINE | mg/l | 5–9 | 50 | 44 | 32 | <5 | <5 | <3 |
| GLYCINE | mg/l | 11–23 | 75 | 4 | 6 | <5 | <5 | <3 |
| THREONINE | mg/l | 12–36 | 215 | 14 | 14 | <5 | <5 | <3 |

|  |  | RSK STANDARD | CCE | BROWN | ENDOCARP | ANALYSIS 3 NOVEMBER, 1985 | | |
|---|---|---|---|---|---|---|---|---|
|  |  |  |  |  |  | WHOLE ORANGE | PEEL | RAG EX ENDOCARP |
| ARGININE | mg/l | 435–1235 | 640 | 900 | 650 | 275 | <5 | 140 |
| ALGNINE | mg/l | 63–196 | 79 | 51 | 42 | <5 | 52 | 44 |
| METHIONINE | mg/l | 0–5 | 13 | 6 | 5 | <5 | <5 | <3 |
| VALINE | mg/l | 8–34 | 20 | 13 | 13 | 13 | <5 | <3 |
| PHENYLALANINE | mg/l | 10–50 | 37 | 33 | <1 | 325 | <5 | 20 |
| ILE | mg/l |  | 7 | <1 | 5 | <5 | <5 | <3 |
| LEUCINE | mg/l | 3–12 | 16 | 8 | 6 | <5 | <5 | <3 |
| LYSINE | mg/l | 22–58 | 70 | 119 | 57 | <5 | <5 | <3 |
| PROLINE | g/l | 0.45–1.30 | 1.00 | 1.30 | 1.40 | 1.50 | 1.07 | 1.30 |

CCE refers to orange juice extracted from pressed sliced whole oranges using counter current extractor BROWN refers to conventionally reamed orange juice using equipment made by Brown International in the United States of America ENDORCARP refers to juice expressed from pressing peeled oranges WHOLE ORANGE refers to communuted oranges PEEL refers to orange peel RAG EX ENDOCARP refers to the solids remaining after pressing juice from the endocarp Limonin the major bitter principle in orange juice is a phenolic compound and is measured in "total polyphenolics" in line 2.

It will be noted that from columns 2 and 5 that approximately ⅓ of total polyphenolics are retained in the discharged solid when processing oranges through CCE.

Whole orange:=2.720
CCE:=1.820

It will further be noted that the cellulosic rag is disproportionately high in polyphenolics which supports our hypothesis of natural chromatography.

I claim:

1. A process for the extraction of soluble materials from whole citrus fruit selected from the group consisting of oranges, mandarins and grapefruit having the skin thereon, said process comprising the steps of:

severing the whole fruit to form fruit slices having the skin thereon;

extracting juice having an amount of bitter principles from said fruit slices with the skin thereon by extracting said fruit slices with water in a countercurrent extractor to form an extracted juice containing insoluble particulate material, said extraction being conducted such that bitter principles are retained or absorbed by said insoluble particulate material relative to said extracted juice so that the introduction of bitter principles into the extracted juice is reduced by about 50%;

subjecting said extracted juice obtained from said countercurrent extractor to a pectinase enzyme in an amount and for a time sufficient to reduce the viscosity of said extracted juice to enable removal of at least some insoluble particulate material from said extracted juice;

deactivating said pectinase enzyme in said extracted juice; and removing at least some of said insoluble particulate material present in said extracted juice together with bitter principles, to obtain citrus juice of reduced bitterness.

2. A process as claimed in claim 1 in which the citrus fruit is subjected to a de-oiling process to remove oils from the flavida of the fruit prior to the fruit being severed.

3. A process as claimed in claim 1, in which the fruit is heated to a temperature of from 55° to 63° C. prior to or just after introduction to the extractor.

4. A process as claimed in claim 3, in which the pectinase enzyme is a pectin glycosidase.

5. A process as claimed in claim 4, in which the pectinase is not deactivated until the viscosity of the liquid extract has fallen by from 5 to 15 centipoise.

6. A process as claimed in claim 5, in which at least some of the insoluble particulate material present in the liquid extract is removed therefrom by filtration or centrifugation.

7. A process as claimed in claim 6, in which the filtration utilizes a filter having a pore size of from 50 to 150 thousandths of an inch.

8. A process as claimed in claim 7, in which the juice resulting from the process contains less than 1% by volume of insoluble particulate material.

* * * * *